United States Patent [19]

Katzen et al.

[11] 4,312,786

[45] Jan. 26, 1982

[54] PROCESS FOR POLYMERIZING OLEFINS AND POLYMERIZATION CATALYSTS USED THEREFOR

[75] Inventors: Stanley J. Katzen, Cincinnati; Louis J. Rekers, Wyoming, both of Ohio

[73] Assignee: National Petro Chemicals Corp., New York, N.Y.

[21] Appl. No.: 154,669

[22] Filed: May 30, 1980

Related U.S. Application Data

[62] Division of Ser. No. 931,598, Aug. 7, 1978, Pat. No. 4,252,926.

[51] Int. Cl.$^3$ .................................................. C08F 4/22
[52] U.S. Cl. .................................... 252/430; 252/428; 252/431 P
[58] Field of Search ..................... 252/428, 430, 431 P, 252/931, 598

[56] References Cited

U.S. PATENT DOCUMENTS 3,984,351 10/1976 Rekers et al. ........................ 252/430
3,985,676 10/1976 Rekers et al. .................... 252/430 X Primary Examiner—Patrick Garvin
Attorney, Agent, or Firm—Kenneth D. Tremain

[57] ABSTRACT

Olefins are polymerized in the presence of catalysts prepared by combining a heat activated supported organophosphoryl chromium compound with an alkyl borane which has been pretreated with hydrogen.

16 Claims, No Drawings

PROCESS FOR POLYMERIZING OLEFINS AND POLYMERIZATION CATALYSTS USED THEREFOR

This is a division, of application Ser. No. 931,598, filed Aug. 7, 1978 and now U.S. Pat. No. 4,252,926.

BACKGROUND OF THE INVENTION

Peters et al. in U.S. Pat. No. 2,892,826 describe the polymerization of olefins in the presence of diborane, other hydrides of boron, or lower boron alkyls adsorbed or absorbed on a group 5a oxide.

The use of chromium compounds in the polymerization of olefins is also well-known. U.S. Pat. Nos. 2,825,721 and 2,951,816 teach the use of $CrO_3$ supported on an inorganic material such as silica, alumina or combinations of silica and alumina, and activated by heating in reducing atmospheres, to polymerize olefins. When, however, a catalyst system of this type is used in techniques such as the well-known particle-form process, the resins produced, while useful in many applications, are unsatisfactory for others because of a deficiency in certain properties such as melt index.

Attempts to improve the properties of polyolefins produced using supported, heat-activated chromium oxide catalysts have been made by adding various compounds to the supported chromium oxide prior to the heat activation thereof. Thus, U.S. Pat. No. 3,484,428 discloses adding boranes or alkyl-substituted boranes to such a catalyst, and U.S. Pat. No. 3,780,011 refers to the use of alkyl esters of boron.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287; and in U.S. Pat. Nos. 3,474,080 and 3,985,676. Other such catalysts are described in copending and commonly assigned application Ser. No. 759,213 filed Jan. 13, 1977 and now Pat. No. 4,100,104. Copending and commonly assigned application Ser. No. 693,803, now Pat. No. 4,118,340 of Rekers claims catalysts comprising reaction products of chromium trioxide and an organoborate compound such as triethyl borate.

Certain of these catalytic materials may be employed in Ziegler-type coordination catalyst systems, or in supported form, alone or in conjunction with metallic or organometallic reducing agents such as, for example, trialkyl aluminum compounds or alkyl boranes. Catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500; 3,985,675; and in the aforesaid copending application Ser. No. 759,213, now Pat. No. 4,100,104.

It has also been disclosed in U.S. Pat. Nos. 3,984,351 and 4,049,896, owned by the assignee of the present invention, that the properties of olefin polymers, e.g., melt indexes, may be substantially improved by the use of a catalyst prepared by depositing chromium and aluminum compounds on an inorganic support material and heat-activating the supported composition in a non-reducing, preferably oxygen-containing atmosphere, at a temperature of from about 300° C. (572° F.) up to the decomposition temperature of the support. The resulting material, as preferably combined with a metallic and/or non-metallic reducing agent, e.g., a trialkyl borane, provides a catalyst system capable of producing polymers having improved flow properties and shear responses in addition to increased melt indexes.

It is among the objects of the present invention to provide yet a further improved technique for preparing catalytic materials, especially olefin polymerization catalysts, and a polymerization process utilizing the same which results in the formation of polymers having increased melt indexes, and improved flow properties, shear response and other desired characteristics.

SUMMARY OF THE INVENTION

In accordance with the present invention, it has been found that an improved olefin polymerization catalyst can be prepared by combining a heat activated, supported organophosphoryl chromium compound and optionally, an aluminum compound, with a hydrogenated alkyl borane, i.e., an alkyl borane which has been pretreated with hydrogen gas. In use, the catalyst of the invention affords olefin polymers of increased melt index values at sensible productivities. Moreover, higher melt indices are found with higher B/Cr ratios, whereas no such correlation would be expected especially with retained productivity values. Still further improvement in melt indices may be achieved with the use of hydrogen modifier.

The chromium compound and, where present, the aluminum compound, can both be deposited upon the support prior to heat activating as in the catalyst preparation procedures disclosed in U.S. Pat. Nos. 3,984,351; 3,985,676; and 4,049,896, and thereafter the hydrogenated triethyl borane can be added to the activated material.

More specifically, the catalysts herein can be prepared by the steps of:

(a) depositing an organophosphoryl chromium compound, preferably one which is obtained by reacting chromium trioxide with an organophosphorus compound having the formula

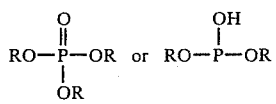

wherein R is alkyl, aralkyl, cycloalkyl or hydrogen, but at least one R is other than hydrogen, upon a solid inorganic support material;

(b) heat activating said support material containing said organophosphoryl chromium product, and optionally, an aluminum compound, at a temperature above 200° C. and below the temperature at which the structure of the support is impaired, for a period of time sufficient to promote the activity of the catalyst; and (c) combining the heat activated supported material of step (b) with an alkyl borane which has been pretreated with hydrogen.

In the event it is desired to employ an aluminum compound together with the organophosphoryl chromium compound in the preparation of the catalysts herein, an alternative procedure calls for first depositing the aluminum compound upon the support and subjecting the support to a first heat activation, depositing the chromium compound upon the support and subjecting the support to a second heat activation as in copending and commonly assigned application Ser. No. 759,213, now U.S. Pat. No. 4,100,104 and thereafter combining the double activated catalyst composition with the hydrogenated borane.

It is believed that the chromium containing compounds and the aluminum compounds react with the surface hydroxyl groups on the inorganic support material during the course of preparing the novel catalyst systems of the present invention.

Use of the olefin polymerization catalyst produced as described herein has, surprisingly, been found to result in the formation of polyethylene and other olefin polymers having increased melt indexes and improved flow properties and shear response.

DESCRIPTION OF THE PREFERRED EMBODIMENTS

The inorganic support materials useful in the present invention include those normally employed for supported chromium catalysts used in olefin polymerizations, e.g., those described in U.S. Pat. No. 2,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. Nos. 3,652,214; 3,652,215; 3,652,216; 3,978,002; and 4,053,565 each of which is incorporated by reference herein. These silica xerogels have a surface area in the range of 200 to 500 m$^2$/g, and a pore volume greater than about 2.0 cc/g, a major portion of which pore volume is provided by pores having pore diameters in the range of from 300 to 600 A.

The chromium containing compounds useful in the present invention are those disclosed in U.S. Pat. No. 3,985,676 and which comprise the reaction product of chromium trioxide with an organophosphorus compound. The organophosphorus compound and the chromium trioxide are brought together in a suitable inert solvent, e.g., cyclohexane, n-hexane, methylene chloride, carbon tetrachloride, etc. In this step in the preparation of the catalyst system, the solid CrO$_3$ is slurried in the solvent and the organophosphorus compound added. Over a period of time, e.g., about one hour, a reaction between the compounds ensues and the chromium trioxide disappears. During this period the solution becomes reddish-brown in color. It is ordinarily filtered simply to insure the absence of any unreacted solid CrO$_3$. Among the organophosphorus compounds which can be reacted with chromium trioxide to provide the organophosphoryl chromium compounds herein are the triorganophosphates and diorganophosphates including such compounds as triphenyl phosphate, tributyl phosphate, triethyl phosphate, trioctyl phosphate, trimethyl phosphate, etc. Also suitable are the mono(-dihydrogen) phosphate or phosphite and di(hydrogen) phosphate derivatives (illustratratively inclusive of monobutyl phosphate, dibutyl phosphate and monoethyl phosphite) and these materials may of course comprise mixtures. Organophosphoryl chromium reaction products are also formed with such phosphorus based compounds as phenyl phosphoric acid, diethyl ethyl phosphonate and trioctyl phosphine oxide. Preferred organophosphorus compounds can be represented by the formulas:

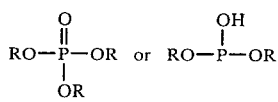

wherein R is alkyl, aralkyl, aryl, cycloalkyl or hydrogen. The preferred organophosphorus compounds are trialkyl phosphates such as triethyl phosphate.

Aluminum compounds which can optionally be employed in the present invention can be represented by the formula:

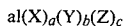

wherein X is R, Y is OR, and Z is H or a halogen; a is 0–3, b is 0–3, c is 0–3, and a+b+c equals 3; and R is an alkyl or aryl group having from one to eight carbon atoms.

Examples of such aluminum compounds include aluminum alkoxides such as aluminum sec-butoxide, ethyl aluminum ethoxide, methyl aluminum propoxide, diethyl aluminum ethoxide, diisobutyl aluminum ethoxide, etc; alkyl aluminum compounds such as triethyl aluminum, triisobutyl aluminum, etc; alkyl or aryl aluminum halides such as diethyl aluminum chloride; aryl aluminum compounds such as triphenyl aluminum, aryloxy aluminum compounds such as aluminum phenoxide and mixed aryl, alkyl and aryloxy, alkyl aluminum compounds.

Pretreatment of the alkyl borane component of the catalysts herein with hydrogen can be carried out by reacting the boron compound, advantageously in a suitable solvent such as hexane, with hydrogen gas at temperatures of from about 90° C. to about 130° C. and at pressures ranging from ambient to about 1,000 p.s.i. with or without a hydrogenation catalyst. The reaction time can be from about 5 minutes up to 8 hours or more. Hydrogen is conveniently supplied to maintain reactor pressure, at a considerable (molar) excess, relative to the alkyl borane in solution, e.g., 2.5 to 6.0:1 H$_2$/TEB in solution. While the precise structure of the hydrogenation product is yet to be determined, the foregoing hydrogenation reaction so alters the nature of the alkyl borane starting material that the polymerization of olefins employing hydrogen pretreated triethyl borane in accordance with this invention results in the production of polyolefins of significantly higher melt index than those attainable with catalysts which are identical in every respect to those herein save being prepared with untreated triethyl borane.

Koester et al. in Liebigs, Ann. Chem., Vol. 644, p. 1ff (1961) disclose the hydrogenation of boron trialkyls at higher temperatures, e.g., 140°–170° C., proceeding to diborane (B$_2$H$_6$). It is believed that diborane is not significantly produced in the present treatment as it is known to be reactive with ethylene to produce triethylborane. Hence, it is believed without limitation that the reaction products comprise materials having at least one B-H bond, which may constitute one or more partially hydrogenated species such as B$_2$H$_2$R$_4$, B$_2$H$_3$R$_3$, B$_2$H$_4$R$_2$ and B$_2$H$_5$R or dimers or ethylene adducts thereof.

While reference herein has been made principally to triethyl borane, it is understood that the invention is applicable to alkyl boranes generally, including trimethyl borane, tripropyl borane, tributyl borane, trihexyl borane, tridodecyl borane, tetraethyl diborane, and the like, the alkyl groups having up to about 12 carbon atoms.

The novel catalysts of the present invention can be prepared by depositing the organophosphoryl chromium compound and, optionally, the aluminum compound, on the inorganic support in any suitable manner such as by vapor coating or by impregnating the support with solutions of the organophosphoryl chromium compound and the aluminum compound in a suitable inert solvent which is normally an anhydrous organic solvent. Such organic solvents include aliphatic, cycloalkyl and alkylaryl hydrocarbons and their halogenated derivatives. A preferred organic solvent is dichloromethane. The organophosphoryl chromium compound can be applied to the support first or the aluminum compound can be applied first or the chromium and aluminum compound can be applied together. In the usual method of catalyst preparation, the support is impregnated first with the chromium containing compound and then the (optional) aluminum compound.

The most effective catalysts have been found to be those containing the chromium compound in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts outside of these ranges can be used to prepare operable catalysts.

After the chromium-containing compound and the aluminum compound have been deposited on the inorganic support, the support is heated in a non-reducing atmosphere, preferably in an oxygen-containing atmosphere, at a temperature above about 300° C. up to the decomposition temperature of the support. Typically, the supported compositions are heated at a temperature of from 500° to 1000° C. The heating time may vary, for example, depending on the temperature used, from ½ hour or less to 50 hours or more. Normally the heating is carried out over a period of 2 to 12 hours. The non-reducing atmosphere which is preferably air or other oxygen-containing gas should be dry and preferably should be dehumidified down to a few parts per million (ppm) of water to obtain maximum catalyst activity. Typically, air used in the procedure described in this application is dried to less than 2-3 ppm of water.

The heat-treated supported chromium and aluminum compounds are used in combination with the hydrogenated alkyl borane to provide the catalysts of this invention. The heat-treated supported organophosphoryl chromium compound and optional aluminum-containing compound can be combined with the pretreated alkyl borane prior to being fed to an olefin polymerization reactor or these two components can be fed separately to an olefin polymerization reactor.

In proportioning the amount of pretreated alkyl borane to the amount of chromium compound used in the catalyst systems of the present invention, fairly wide latitude is available, but some guidelines have been established consistent with good yield, favorable polymer properties and economic use of materials. For example, in the use of pretreated triethyl borane with an amount of chromium compound sufficient to yield about 1% Cr by weight of the support the parameters set forth below are representative. The atomic ratios are based upon a calculation of the boron in the pretreated triethyl borane versus the chromium content present in the chromium compound on the support.

Based upon a catalyst composition containing about 1% Cr based upon the weight of the support, the preferred amount of pretreated triethyl borane is about 5% by weight based upon the weight of the support giving a B/Cr atomic ratio of about 2.7/1. The preferred range of atomic ratios of B to Cr is from about 0.1/1 to 10/1, or from about 0.19 to about 19% pretreated triethyl borane. The overall practicable limits, in terms of a B/Cr ratio, are from about 0.01/1 to about 20/1, and in terms of weight, are from about 0.02% to about 38% by weight based upon the weight of the support.

With respect to the optional aluminum containing component, based upon a catalyst composition containing about 1% Cr by weight of the support, the preferred amount for use therewith, e.g., triisobutyl aluminum, is about 11.4% by weight and equivalent to an Al/Cr atomic ratio of about 3/1. The preferred range of atomic ratios of Al to Cr is from about 0.5/1 to about 8/1, or from about 1.9% to about 30% by weight triisobutyl aluminum. The overall practicable limits of triisobutyl aluminum in terms of the Al/Cr atomic ratio are from about 0.1/1 to 20/1, and in terms of weight are from about 0.4% to about 75% by weight.

Identical considerations and procedures are involved in the double activation method of preparing the catalysts referred to above with the exception that the aluminum compound is first deposited upon the support and heat activated followed by deposition and activation of the chromium compound. Typically, the aluminum compound-coated support is heat activated at temperatures of from about 90° C. to about 1100° C., preferably at from about 260° C. to about 820° C., and activation is completed by treating the chromium compound-coated support at temperatures within the range of from about 430° C. to 1100° C., best results having been obtained by activation at temperatures of from about 850° C. to 1000° C.

As indicated above, the catalyst compositions of this invention are amenable to use with conventional polymerization processes for olefins, in particular 1-olefins having 2-8 carbon atoms and are suitable for polymerization effected under temperature and pressure conditions generally employed in the art, e.g., temperatures of from about 40° C. to about 200° C. and preferably from about 70° C. to 110° C., and pressures of from 200 to 1000 psig and preferably from 300 to 800 psig, as are used in slurry or particle form polymerizations.

Hydrogen may be supplied to the reaction zone as a modifier for example at a partial pressure of 30 to 120 p.s.i. and is preferred for optimization of results.

A series of olefin polymerizations, the results of which are reported below, were carried out to demonstrate the ability of the novel catalyst systems of the present invention to produce polymers having enhanced physical properties such as increased melt indexes. The polymerizations were carried out in a stirred autoclave using isobutane as a diluent. The catalyst is added along with the isobutane solvent to a stirred one gallon autoclave. The contents of the stirred autoclave are then heated to the polymerization temperature, i.e., 88° to 108° C. Hydrogen, if used, is added and then the ethylene is added to give 10 mol % in the liquid phase at which time the total pressure will be from about 425 to 455 psig. Polymerization begins almost immediately as noted by the ethylene coming from the ethylene demand supply system to the reactor. After approximately one hour of polymerization, the reaction is terminated by dropping the reactor contents into a pressure let-down system. The melt index (M.I.) of the polymers prepared was determined using ASTM D-1238 (condition E).

The catalysts used in the polymerizations runs were prepared in accordance with the following catalyst preparation procedures:

CATALYST PREPARATION PROCEDURE NO. 1

125 ml of dichloromethane were placed in a 3-neck 500 ml flask equipped with a nitrogen inlet for blanketing, a gas outlet tube, magnetic stirring means, and a 100 ml dropping funnel. Under a nitrogen cover, 9.70 gms $CrO_3$ (0.097 m) were added to the stirred flask containing the dichloromethane solvent. From the dropping funnel 17.5 gms triethyl phosphate (0.097 m) dissolved in 75 ml dichloromethane were added over a period of 20 minutes. Within five minutes of the beginning of the addition of the triethyl phosphate the solution in the flask turned dark reddish-brown in color. At the end of one hour of stirring all the $CrO_3$ had disappeared and the solution had become a dark reddish-brown color. Upon weighing, the solution was found to weigh 217.6 gms.

In order to place the compound on a support, 230 grams of a silica xerogel having a pore volume of about 2.5 cc/g prepared in accordance with the disclosure in U.S. Pat. No. 3,652,215 (Polypor Silica Gel) were placed in a 2000 ml round bottom flask, equipped with a stirrer and provided with a nitrogen blanket. Then 100 grams of the reddish-brown filtrate (the solution was passed through a filter to insure the absence of unreacted $CrO_3$) were added to the flask containing the Polypor Silica Gel. After about 15 minutes, the gel had turned a brownish color and the dichloromethane solvent was almost colorless. This indicated that the catalyst compound was very strongly and preferentially adsorbed on the gel. The supernatant liquid was removed by filtration and the gel was dried in a rotary evaporator at 55° C. and 29 inches Hg vacuum.

The dried and catalyst coated gel containing 1.02% wt. chromium and 0.60% wt. phosphorus was then treated at elevated temperature, i.e., 1650° F. for 6 hours while simultaneously passing dry air through the catalyst.

200 gm of a 15% hexane solution of triethyl borane diluted wth 1500 g hexane were introduced into a reactor and heated to about 100° C. whereupon hydrogen gas at 480 p.s.i. was added. The temperature was then raised to about 90°–120° C. and maintained from 30 minutes up to four hours. Hydrogen was supplied as necessary to maintain reactor pressure and was calculated to be present in solution at a molar ratio ($H_2$/TEB) of about 4.6:1. Optionally, small quantities of catalyst for the hydrogenation reaction were added to the reactor for the preparation of individual lots of pretreated triethyl borane. An amount of the solution of hydrogenated triethyl borane was added to the heat activated catalyst sufficient to provide the B/Cr ratios given in the examples.

CATALYST PREPARATION PROCEDURE NO. 2

Polypor Silica Gel was added to a 2000 ml, 3-neck round bottom flask equipped with a stirrer, nitrogen inlet and y-tube with water condenser. A nitrogen atmosphere was maintained during the coating operation. Dichloromethane was then added to the flask containing the silica gel and stirring was commenced to insure uniform wetting of the gel. A dichloromethane solution of the reaction product of $CrO_3$ and triethyl phosphate prepared as described in Catalyst Preparation Procedure No. 1 was then added to the flask in sufficient quantity to provide a dry coated catalyst containing about 1% by weight of Cr. The supernatant liquid was removed by filtration and the coated gel was dried in a rotary evaporator at 6° C. and with 29 inches of Hg vacuum.

Dichloromethane was added to a similar flask as used above and while maintaining a nitrogen atmosphere stirring was commenced. To the flask was added the supported chromium composition prepared above. A solution of dichloromethane and aluminum sec-butoxide was prepared in a pressure equalizing dropping funnel and the funnel attached to the stirred flask. The aluminum sec-butoxide solution was gradually added to the flask at the rate of 10 grams of solution per minute. After the addition of the solution was complete, the slurry in the flask was stirred for about 1 hour. The supernatant liquid was removed by filtration and the coated gel was dried in a rotary evaporator at temperatures up to about 60° C. and 29 inches Hg vacuum.

To heat activate the catalyst composition prepared above, the supported catalyst was placed in a cylindrical container and fluidized with dry air at 0.20 feet per second superficial lineal velocity while being heated to a temperature of 900° C. and held at this temperature for six hours. The activated supported catalyst was recovered as a powder.

An amount of the solution of triethyl borane pretreated with hydrogen gas from Catalyst Preparation Procedure No. 1 was added to the heat activated catalyst to provide the B/Cr ratios given in the examples.

In Table I, a series of polymerizations were carried out to illustrate the results of using pretreated triethyl borane in the catalyst of Procedure 1 with differences in preparation as noted. The results were as follows:

TABLE I

EFFECT OF PRESENCE IN CATALYST SYSTEM OF TRIETHYL BORANE PRETREATED WITH HYDROGEN GAS ON MELT INDEX OF POLYMERIZATE AFTER ONE HOUR POLYMERIZATION RUNS

| Example | B/Cr Ratio | Productivity (gm/gm) | M.I.(Powder) |
|---|---|---|---|
| 1 | 3 | 481 | 59.0 |
| 2 | 3 | 335 | 29.0 |
| 3 | 3 | 302 | 138 |
| 4 | 9 | 581 | 23.5 |
| 5 | 9 | 291 | 143 |
| 6 | 9 | 406 | 56.8 |

| Conditions | |
|---|---|
| Triethyl Borane Pretreatment Temperature | 120° C. |
| Pretreatment Time | 30 minutes |
| Hydrogen | 30 p.s.i. |
| Polymerization Temperature | 100° C. |
| Diluent | Isobutane |
| Ethylene | 10 mole % |

Under similar conditions, the catalysts of U.S. Pat. No. 4,049,896 containing triethyl borane which had not been pretreated with hydrogen provided a polyethylene having a maximum M.I. of 22.6 at 120 p.s.i. $H_2$ and in most cases, an M.I. considerably lower than this.

Table II below sets forth the results of carrying out extended polymerization employing the catalysts of Procedure No. 1.

TABLE I
EFFECT OF PRESENCE IN CATALYST SYSTEM OF TRIETHYL BORANE PRETREATED WITH HYDROGEN GAS ON MELT INDEX OF POLYMERIZATE AFTER EXTENDED POLYMERIZATION RUNS

| Example | Ratio B/Cr | Polymerization Time (hrs) | Hydrogen (psi) | Productivities (qm/qm) | M.I. (Powder) |
|---|---|---|---|---|---|
| 7 | 3 | 2 | 30 | 1581 | 5.9 |
| 8 | 3 | 2 | 30 | 695 | 8.9 |
| 9 | 6 | 2 | 30 | 942 | 49.9 |
| 10 | 6 | 2 | 30 | 2212 | 7.8 |
| 11 | 3 | 2 | 30 | 1635 | 3.8 |
| 12 | 3 | 2 | 30 | 1910 | 3.4 |
| 13 | 6 | 2 | 30 | 1642 | 6.0 |
| 14 | 6 | 2 | 30 | 1320 | 18.8 |
| 15 | 6 | 1.9 | 30 | 1612 | 10.8 |
| 16 | 9 | 1.5 | 30 | 1688 | 11.7 |
| 17 | 9 | 2 | 30 | 844 | 41.7 |
| 18 | 9 | 2 | 30 | 1490 | 10.4 |
| 19 | 9 | 2 | 30 | 1098 | 17.8 |
| 20 | 9 | 2 | 120 | 1539 | 43.9 |
| 21 | 9 | 2 | 120 | 1164 | 24.7 |
| 22 | 9 | 2 | 120 | 1545 | 20.8 |
| 23 | 9 | 2 | 120 | 1685 | 35.0 |

| Conditions | |
|---|---|
| Triethyl Borane Pretreatment Temperature | 120° C. |
| Pretreatment Time | 30 minutes |
| Polymerization Temperature | 100° C. |
| Diluent | isobutane |
| Ethylene | 10 mole % |

In Table III, three methods of pretreating the triethyl borane component of the catalysts of Procedure No. 2 and their effects on polymerization are shown.

TABLE III

| Example | Method of Pretreating Triethyl Borane | Productivity gm Polyethylene/ gm catalyst | M.I. (Powder) |
|---|---|---|---|
| 24 | A | 1483 | 29.8 |
| 25 | | 1685 | 35.0 |
| 26 | B | 1049 | 42.0 |
| 27 | | 1035 | 39.1 |
| 28 | C (5 gm of catalyst of Procedure No. 2) | 964 | 165.3 |
| 29 | | 958 | 120.0 |
| 30 | B | 707 | 17.4 |
| 31 | | 717 | 21.4 |
| 32 | C (15 gm of catalyst of Procedure No. 2) | 1219 | 24.9 |
| 33 | | 1414 | 24.4 |

A = Triethyl borane is pretreated with hydrogen in the polymerization reactor followed by addition of the polymerization mixture.

B = Hydrogen pretreated triethyl borane was separately prepared and added to the polymerization mixture.

C = Triethyl borane was pretreated with hydrogen in the presence of a catalyst.

| Conditions | |
|---|---|
| Triethyl Borane Pretreatment Temperature | 120° C. |
| Triethyl Borane Pretreatment Time | 4 hours |
| Catalyst Activation Temperature | 890° C. |
| Polymerization Temperature | 100° C. |
| Diluent | isobutane |
| Ethylene | 10 mole % |
| Hydrogen - Examples 24 to 29 | 120 p.s.i. |
| Hydrogen - Examples 30 to 33 | 30 p.s.i. |
| B/Cr Ratio | 9/1 |

From Table III, it is seen that regardless of the particular procedure followed for the preparation and addition of pretreated triethyl borane, polymerizates of consistently high melt index are obtained.

Table IV below evaluates several lots of pretreated triethyl borane prepared with different hydrogenation catalyst systems and compares such pretreated triethyl boranes with triethyl borane which has been prepared in the absence of hydrogenation catalyst and triethyl borane which has not been pretreated at all.

TABLE IV
HYDROGENATED TRIETHYL BORANE PREPARED WITH DIFFERENT CATALYST SYSTEMS

| Example | Hydrogenation Catalyst (gm) | Productivity | M.I. | H.L.M.I.* |
|---|---|---|---|---|
| 34 | None | 653 | 27.7 | 2477 |
| 35 | 25.2 Procedure No. 2 | 862 | 27.0 | 1508 |
| 36 | 5.2 Procedure No. 2 | 897 | 31.9 | 2760 |
| 37 | 21 Nickel acetate on Procedure No. 1 | 922 | 26.0 | 1591 |
| 38 | 10 Nickel-kieselguhr | 916 | 23.1 | — |
| 39 | 15.8 Procedure No. 1 | 795 | 45.9 | — |
| 40 | Non-pretreated | 619 | 9.4 | 913 |

| Conditions | |
|---|---|
| Triethyl Borane Pretreatment Temperature | 120° C. |
| Catalyst | Procedure No. 2 |
| Catalyst Activation Temperature | 890° C. |
| Diluent | isobutane |
| Ethylene | 10 mole % |
| Hydrogen | 30 p.s.i. |

*High Load Melt Index measured by ASTM D-1238 (Condition F).

The remarkable difference in melt indices between polymerizates prepared with the catalysts of this invention and a polymerizate prepared with a catalyst containing non-pretreated triethyl borane is demonstrated in the above results.

What is claimed is:

1. A process for preparing an olefin catalyst which comprises:
   (a) depositing an organophosphoryl chromium compound obtained by reacting chromium trioxide with an organophosphorous compound having the formula

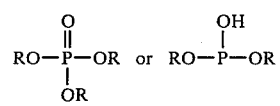

wherein R is alkyl, aralkyl, cycloalkyl or hydrogen, but at least one R is other than hydrogen, upon a solid inorganic support material;
   (b) heat activating said support material containing said organophosphoryl chromium product at a temperature above about 200° C. and below the temperature at which the structure of the support is impaired, for a period of time sufficient to promote the activity of the catalyst; and, (c) combining the heat activated supported material of step (b) with triethyl borane which has been pretreated with hydrogen under reaction conditions sufficient to result in a catalyst which is capable of promoting the production of polyolefins of significantly higher melt index than attainable with the same catalyst except having been prepared with untreated triethyl borane which has not been pretreated by reaction with hydrogen.

2. The process of claim 1 wherein the support material is a silica gel.

3. The process of claim 1 wherein the support material is alumina.

4. The process of claim 1 wherein the triethyl borane is pretreated with hydrogen at temperatures of from about 90° C. to about 130° C. at pressures ranging from ambient to about 1,000 p.s.i. and for periods of from about 15 minutes to about 8 hours.

5. The process of claim 4 wherein the pretreatment of triethyl borane with hydrogen takes place in the presence of a hydrogenation catalyst.

6. The process of claim 5 wherein an organoaluminum compound is deposited upon the support prior to the organophosphoryl chromium compound and the supported organoaluminum compound is subjected to a heat activation operation carried out from about 90° C. to about 1100° C.

7. The catalyst system prepared by the process of claim 1.

8. The catalyst system prepared by the process of claim 6.

9. A process for preparing an olefin catalyst which comprises:

(a) depositing an organophosphoryl chromium compound obtained by reacting chromium trioxide with an organophosphorus compound having the formula

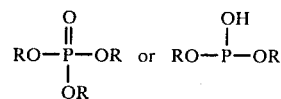

wherein R is alkyl, aralkyl, cycloalkyl or hydrogen, but at least one R is other than hydrogen, upon a solid inorganic support material;

(b) heat activating said support material containing said organophosphoryl chromium product at a temperature above about 200° C. and below the temperature at which the structure of the support is impaired, for a period of time sufficient to promote the activity of the catalyst; and (c) combining the heat activated supported material of step (b) with an alkyl borane which has been pretreated with hydrogen under reaction conditions sufficient to result in a catalyst which is capable of promoting the production of polyolefins of significantly higher melt index than attainable with the same catalyst except having been prepared with untreated triethyl borane which has not been pretreated by reaction with hydrogen.

10. The process of claim 9 wherein the support material is a silica gel.

11. The process of claim 9 wherein the support material is alumina.

12. The process of claim 9 wherein the alkyl borane is pretreated with hydrogen at temperatures of from about 90° C. to about 130° C. at pressures ranging from ambient to about 1,000 p.s.i. and for periods of from about 15 minutes to about 8 hours.

13. The process of claim 12 wherein the pretrestment of alkyl borane with hydrogen takes place in the presence of a hydrogenation catalyst.

14. The process of claim 13 wherein an organoaluminum compound is deposited upon the support prior to the organophosphoryl chromium compound and the supported organoaluminum compound is subjected to a heat activation operation carried out from about 90° C. to about 1100° C.

15. The catalyst system prepared by the process of claim 9.

16. The catalyst system prepared by the process of claim 14.

* * * * *